(12) United States Patent
Mitchell et al.

(10) Patent No.: US 6,446,683 B1
(45) Date of Patent: Sep. 10, 2002

(54) ATTACHMENT FOR A VACUUM PUMP

(75) Inventors: David Mitchell, Carina; Alan Grieves, Tarragindi, both of (AU)

(73) Assignee: ABW Australia Pty LTD (AU)

( * ) Notice: Subject to any disclaimer, the term of this patent is extended or adjusted under 35 U.S.C. 154(b) by 0 days.

(21) Appl. No.: 09/926,306
(22) PCT Filed: Feb. 12, 2001
(86) PCT No.: PCT/AU01/00127
§ 371 (c)(1),
(2), (4) Date: Oct. 11, 2001
(87) PCT Pub. No.: WO01/60671
PCT Pub. Date: Aug. 23, 2001

(30) Foreign Application Priority Data

Feb. 15, 2000 (AU) .............................. PQ 5651

(51) Int. Cl.[7] .............................................. B65B 31/04
(52) U.S. Cl. .............................. 141/65; 141/21; 141/25; 141/67; 141/84
(58) Field of Search .............................. 141/18, 21, 25, 141/27, 59, 65, 67, 84; 184/1.5; 222/385

(56) References Cited

U.S. PATENT DOCUMENTS

| | | | |
|---|---|---|---|
| 1,439,295 A | * 12/1922 | Craig | 141/26 |
| 5,002,154 A | * 3/1991 | Chen | 141/27 |
| 5,265,653 A | * 11/1993 | Herlth | 141/59 |
| 5,497,864 A | 3/1996 | Oien | |
| 5,964,326 A | 10/1999 | Lee et al. | |

FOREIGN PATENT DOCUMENTS

| | | |
|---|---|---|
| FR | 2 777 249 | 10/1998 |
| GB | 2 394 749 | 6/1995 |

* cited by examiner

Primary Examiner—Timothy L. Maust
(74) Attorney, Agent, or Firm—Hoffman, Wasson & Gitler, PC

(57) ABSTRACT

An attachment (3) for a vacuum gun (2), for evacuating and containing a fluid from a reservoir of fluid, such as brake fluid from a brake system. The attachment (3) has a body (21, 25) with an inlet (22) for the fluid and an outlet (24) that may be sealingly attached to a front end of a gun (2). The attachment (3) also has a coupling (26), a container (27) which is releasably attachable to the coupling (26), a first passage (33, 34) extending between the inlet (22) and the container (27), a second passage (35, 36) extending between the container (27) and the outlet (24), and a tap (70) which may be moved to either close or open the said passages (33, 34, 35, 36). In use, the gun (2) generates a vacuum within the attachment (3) and when the tap (70) is in the open position, the fluid may be collected within the container (27). A float valve (83) within the second passage (35) ensures that the container (27) cannot overfill with fluid.

20 Claims, 4 Drawing Sheets

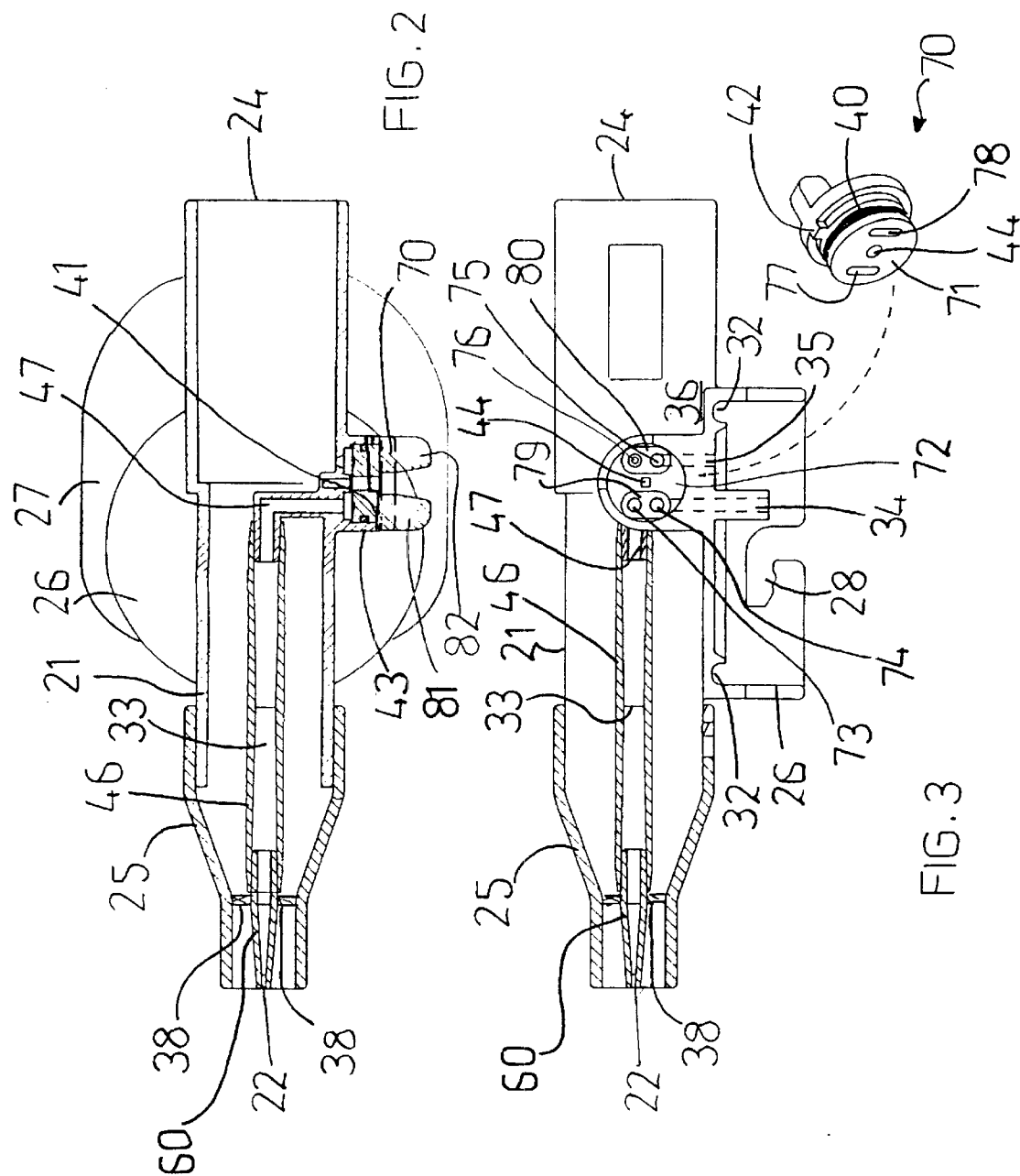

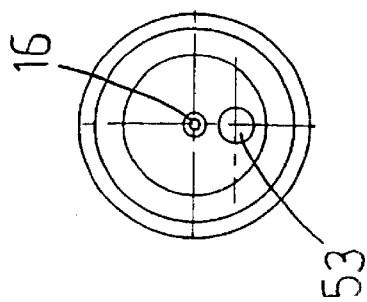
FIG.6
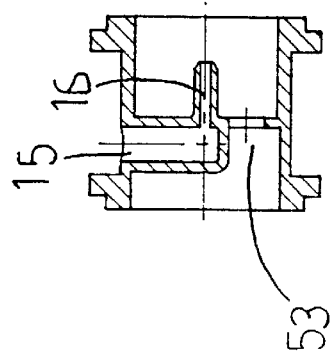
FIG.4
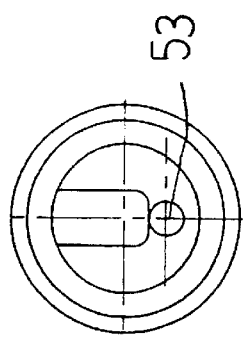
FIG.8
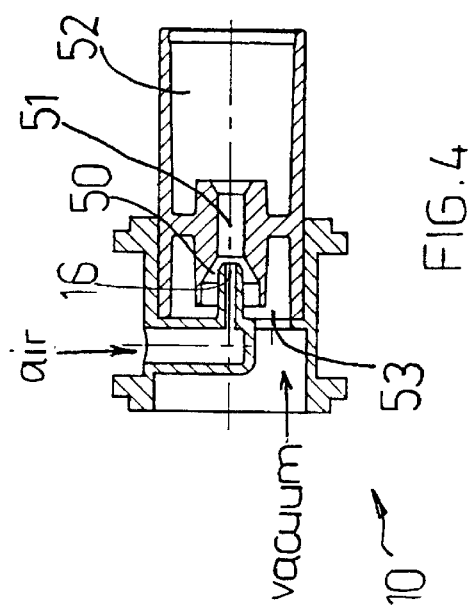
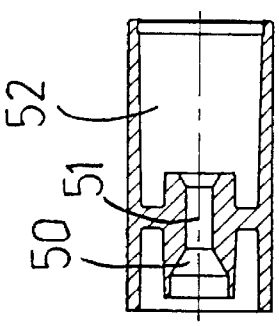
FIG.5
FIG.7

ATTACHMENT FOR A VACUUM PUMP

This invention relates to an attachment for a vacuum pump. In particular, the invention relates to an attachment for a vacuum gun, for evacuating fluid from a reservoir of fluid and for containing the fluid that has been evacuated.

The invention has been developed primarily for evacuating brake fluid from the brake system of a vehicle and will therefore be described in this context. It is to be appreciated, however, that the invention may have other uses.

BACKGROUND ART

Venturi motors are well known in the art for their use in vacuum pumps. Venturi motors typically comprise a tube with a short constriction in the middle (a throat) between two tapered ends (an intake and an outlet). The throat causes a drop in pressure in the fluid flowing through it. Compressed air or other compressed fluids may be used to power such motors. Typically, the intake of the venturi tube is positioned adjacent an inlet through which compressed air enters the venturi motor, and fluid that is to be evacuated from a reservoir of fluid is introduced through a port (from hereon referred to as a vacuum port) which channels the fluid between the air inlet and throat. As compressed air exits the inlet it expands and increases in velocity before entering the throat of the venturi tube. This creates a vacuum or negative pressure at the vacuum port so that the fluid is drawn into the venturi tube.

There are presently a number of methods for bleeding brake fluid from bleeder ports of vehicle brake systems. One of these methods involves attaching a device generally known as a pressure bleeder to the master cylinder of the vehicle and pressurizing the brake system. Once under pressure, each bleeder port of the brake system is opened systematically to bleed the brakes. Another method entails the use of a device generally known as a vacuum bleeder. This device attaches to a bleeder port of the vehicle and draws brake fluid from the master cylinder.

The devices employed in bleeding vehicle brake systems have disadvantages in that they may be difficult to use, namely that they may be heavy and difficult to maneuver into position for bleeding.

It is therefore an object of the present invention to provide an attachment for a vacuum pump that minimises the disadvantages of the devices referred to above, or provides the public with a useful or commercial choice.

SUMMARY OF THE INVENTION

According to a first aspect of the present invention there is provided an attachment for a vacuum pump, for evacuating and containing a fluid from a reservoir of fluid, said attachment having:
  a body with an inlet for the fluid and an outlet, and the outlet is attachable to the pump;
  a coupling intermediate the inlet and outlet;
  a container which is releasably attachable to the coupling;
  a first passage extending between the inlet and the container;
  a second passage extending between the container and the outlet; and
  an operating member associated with at least one of the said passages and which is moveable to either close or open the associated passage, and when a vacuum is generated within the attachment by the pump and the operating member is in the open position, the fluid may be collected within the container.

The attachment may have a float valve located within the second passage for blocking this passage when the container is full of fluid.

The operating member may consist of a tap moveable between the open and closed positions. Preferably, the tap is able to close or open both of the said passages. The tap may be received within a spigot extending from the attachment body. The tap and spigot may form part of the first and/or second passages.

The first passage may be provided in part by a delivery tube extending between the inlet and the spigot. Preferably, the delivery tube comprises two or more detachable pieces.

The inlet of the attachment body may be at the end of a nozzle. The nozzle and a piece of the delivery tube may be detachable from the remainder of the body. The nozzle may frictionally engage the remainder of the body and delivery tube. The body and nozzle may be attachable by any other suitable means. The attachment may further have a hose that is attachable to the nozzle, for communicating fluid from the reservoir to the inlet.

The coupling which allows the container to be secured to the body may be a screw threaded coupling, a snap fitting coupling, a bayonet coupling or any other suitable coupling. Preferably, the coupling has a seal such that the fluid cannot leak from the container by accident.

The container may have reinforcing structures such as ribs to prevent walls of the container from collapsing under negative pressure.

According to a second aspect of the present invention there is provided a vacuum gun assembly for evacuating and containing a first fluid from a reservoir of fluid, said gun assembly comprising a vacuum gun and an attachment for the gun, with said gun having:
  a body having a grip, a barrel and a bore extending through the barrel from a front end to a rear end of the gun;
  a venturi motor within the bore; and
  an inlet into the body for a second fluid which powers the venturi motor and the second fluid discharges through the rear end of the gun so that a vacuum is generated within the attachment,
with said attachment having:
  a body with an inlet for the first fluid and an outlet, and the outlet is attachable to the front end of the gun;
  a coupling intermediate the inlet and outlet;
  a container which is releasably attachable to the coupling;
  a first passage extending between the inlet and the container;
  a second passage extending between the container and the outlet; and
  an operating member associated with at least one of the passages and which is moveable to either close or open the associated passage, and when a vacuum is generated within the attachment by the pump and the operating member is in the open position, the fluid may be collected within the container.

The outlet of the attachment may be of sufficient diameter to seal around the front end of the gun. Optionally, other means for attaching the attachment to the gun may be used.

The gun may have a perforated plate covering the discharge end of the venturi motor for reducing the noise of the second fluid leaving the gun. The gun may have an insert adjacent the perforated plate for further reducing the noise of the second fluid prior to discharge. The insert is preferably porous and consists of foam. The foam and plate may be directly coupled to the venturi motor.

The rear end of the gun may be fitted with a hose in order to direct the discharged fluid away from an operator of the gun assembly.

Preferably, the gun is of the type disclosed in Patent Specification WO 99/20399.

Preferred embodiments of the invention will now be described with reference to the accompanying drawings.

BRIEF DESCRIPTION OF THE DRAWINGS

FIG. 2 is a partially sectioned plan view of the attachment of the gun assembly of FIG. 1;

FIG. 3 is a partially sectioned elevational view and a partially exploded view of the attachment of FIG. 2, but without a container;

FIG. 4 is a longitudinal sectional view of a venturi motor of the gun assembly of FIG. 1, with the direction of vacuum and compressed air flow indicated;

FIG. 5 is a sectional view of a venturi tube that is part of the venturi motor of FIG. 4;

FIG. 6 is a sectional view of part of the venturi motor of FIG. 4;

FIG. 7 is a front end view of the venturi motor part of FIG. 6;

FIG. 8 is a rear end view of the venturi motor part of FIG. 6; and

DESCRIPTION OF THE PREFERRED EMBODIMENTS

Figure 1:
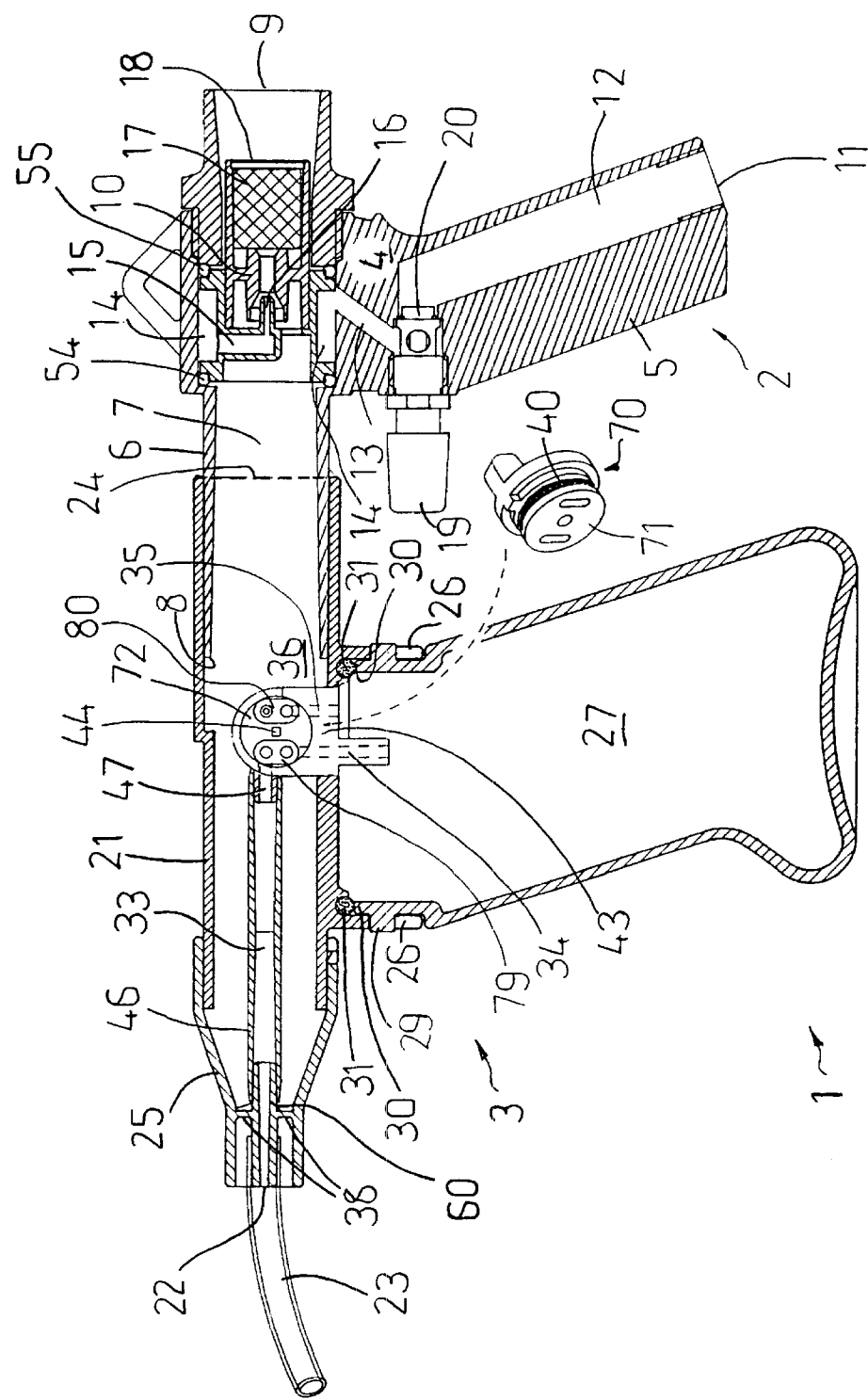
FIG. 1 is a partially sectioned elevational view and a partially exploded view of a vacuum gun assembly having a gun and an attachment for the gun, according to an embodiment of the invention.

In all of the drawings, like reference numerals refer to like parts.

Referring first to FIG. 1, there is shown a vacuum gun assembly 1 comprising a vacuum gun 2 and an attachment 3 for the gun 2. The gun assembly 1 will be described by way of example with reference to use in evacuating brake fluid from a vehicle brake system.

The gun 2 has a body 4 of the type disclosed in Patent Specification WO 99/20399 with a grip 5, a barrel 6 and a bore 7 extending from a front end 8 to a rear end 9 of the gun 2.

The gun 2 has a venturi motor 10 within the bore 7 which, in this example, is powered by compressed air that feeds into the body 4 through inlet 11 and flows to the venturi motor 10, after which the air is discharged through the rear end 9 of the gun 2. To reach the motor 10, air flows from inlet 11 to passage 12 to passage 13 to annular space 14 to passage 15 and to venturi motor inlet 16. The discharge end of the motor 10 contains a foam insert 17 and is covered with a perforated plate 18, both of which are directly in the path of the air stream. Insert 17 and plate 18 serve to reduce the noise caused by the air prior to discharge. A spring-loaded button 19 operatively connected to a moveable valve 20 controls the supply of air to the motor 10. The valve 20 inhibits the flow of air to the motor 10 when the button 19 has not been depressed.

The attachment 3 for the gun 2 has a body 21, 25 with an inlet 22 at one end and an outlet 24 at the other end. The outlet 24 is located about the front end 8 of the gun 2. A hose 23 connects the inlet 22 to a bleeder port of the brake system of the vehicle (not shown). The inlet 22 is located on the end of a nozzle 25 that frictionally engages the remainder of the body 21 which is in the shape of a barrel 21.

The body 21, 25 has a coupling 26 intermediate the ends 22, 24 of the body to which a container 27 may be releasably attached. The coupling 26 is best viewed in FIG. 3. The coupling 26 extends outwardly from the body 21 and is adapted to receive the container 27. The coupling 26 has slots 28 (see FIG. 3) adapted to receive opposed projections 29 extending outwardly from an upper part of the container 27 (see FIG. 1). An upper lip 30 of the container 27 abuts a seal 31 when the container 27 is secured to the coupling 26. The seal 31 is received within a groove 32 (see FIG. 3).

Part of the wall of the container 27 facing the grip 5 has a number of horizontal ribs that extend parallel to one another (not shown). These ribs strengthen the container 27 and prevent it from collapsing under negative pressure when the venturi motor 10 is in use.

Referring now to FIGS. 1–3, a passage 33, 34 extends between the inlet 22 and the container 27. A further passage 35, 36 extends between the container 27 and the outlet 24. Both of the passages 33, 34 and 35, 36 extend through a spigot 43 and tap 70 arrangement. The tap 70 can be positioned to either complete each passage (ie. open each passage) or to render each passage discontinuous (ie. close each passage).

The spigot 43 extends outwardly from the barrel 21 and receives the tap 70 (see FIG. 2). A seal 40 extends about the tap 70 (see FIG. 1). A projection 41 (see FIG. 2) extends from the spigot 43 and acts as a stop against which abutment 42 on the tap 70 may abut to limit the degree to which the tap 70 may rotate within the spigot 43. Projections 81 and 82 are used as handles to turn tap 70. The tap 70 can rotate about an axis shown at 44 in FIG. 3 to either open or close the passages 33, 34, 35, 36. A surface of the tap 70 can be rotated relative to a surface 72 of the spigot 43 in a fluid-tight manner. Passage 33, 34 has two ends 73, 74 adjacent one another in the spigot 43 which face the surface 71 of the tap 70, and are flush with the surface 72 of the spigot 43. Passage 35, 36 also has two ends 75, 76 adjacent one another in the spigot 43 that face the surface 71 of the tap 70 and are flush with the surface 72 of the spigot 43. The surface 71 of the tap 70 has two recesses 77, 78. When recesses 77 and 78 are positioned in alignment over ends 73, 74 and 75, 76, ie. when the operating member is in the "on" position, passages 33, 34 and 35, 36 are completed, i.e. open.

Each pair of ends 73, 74 and 75, 76 is formed by a pair of holes in a rubber seal (not shown), each of which snuggly fits within a recess 79 or 80 of the spigot 43. This arrangement serves to properly seal passage ends 73, 74, 75, 76.

In use, when the tap 70 is rotated about axis 44 to the "on" position, passages 33, 34 and 35, 36 extend through the tap 70 and spigot 43 arrangement as the recesses 77, 78 of surface 71 are in alignment with ends 73, 74 and 75, 76. When the tap 70 is rotated to the "off" position, the recesses 77, 78 of the tap 70 are out of alignment with passage ends 73, 74, 75, 76 and as these ends are sealed fluid cannot flow through these passages.

Referring to FIGS. 1, 2 and 3, passage 33 is provided by a multipiece delivery tube 60, 46, 47 which connects the inlet 22 to the tap 70 spigot 43 arrangement. Delivery tube piece 60 is held in position by a fin 38 that extends from the nozzle 25. The nozzle 25 is detachable from the barrel 21 and will detach with at least tube piece 60. Delivery tube piece 47 is attached to the barrel 21 and has a right-angle bend (see FIG. 2).

Referring now to FIG. 4, there is shown a venturi motor 10 that has a venturi tube with an intake 50, a throat 51 and an outlet 52, an inlet 16 adjacent the intake 50 for producing a high pressure air stream, and, a vacuum port 53 in communication with the inlet 22 of the attachment 3 for creating a vacuum within the attachment 3.

The venturi tube is best viewed in FIG. 5. The inlet 16 and vacuum port 53 are best viewed in FIGS. 6, 7 and 8. The venturi motor 10 shown in FIG. 4 is assembled from the parts of FIGS. 5 and 6.

Referring to FIG. 1, the venturi motor 10 is mounted within the bore 7 of the gun 2. Two seals 54, 55 ensure that the motor 10 and body 4 are in an airtight arrangement.

In use, a source of compressed air is connected to inlet 11 of the grip 4 and the hose 23 is connected to a bleeder port of the brake system. Button 19 is depressed, compressed air powers the venturi motor 10 and air is evacuated from the attachment 3 after the tap 70 has been turned "on" (ie. passages 34, 35 and 36, 37 are opened). Brake fluid is then drawn from the brake system through hose 23 to passage 33, 34 and then contained with the container 27. At the completion of bleeding, the button 19 is released. Container 27 is then released from coupling 26 and emptied.

Figure 9:
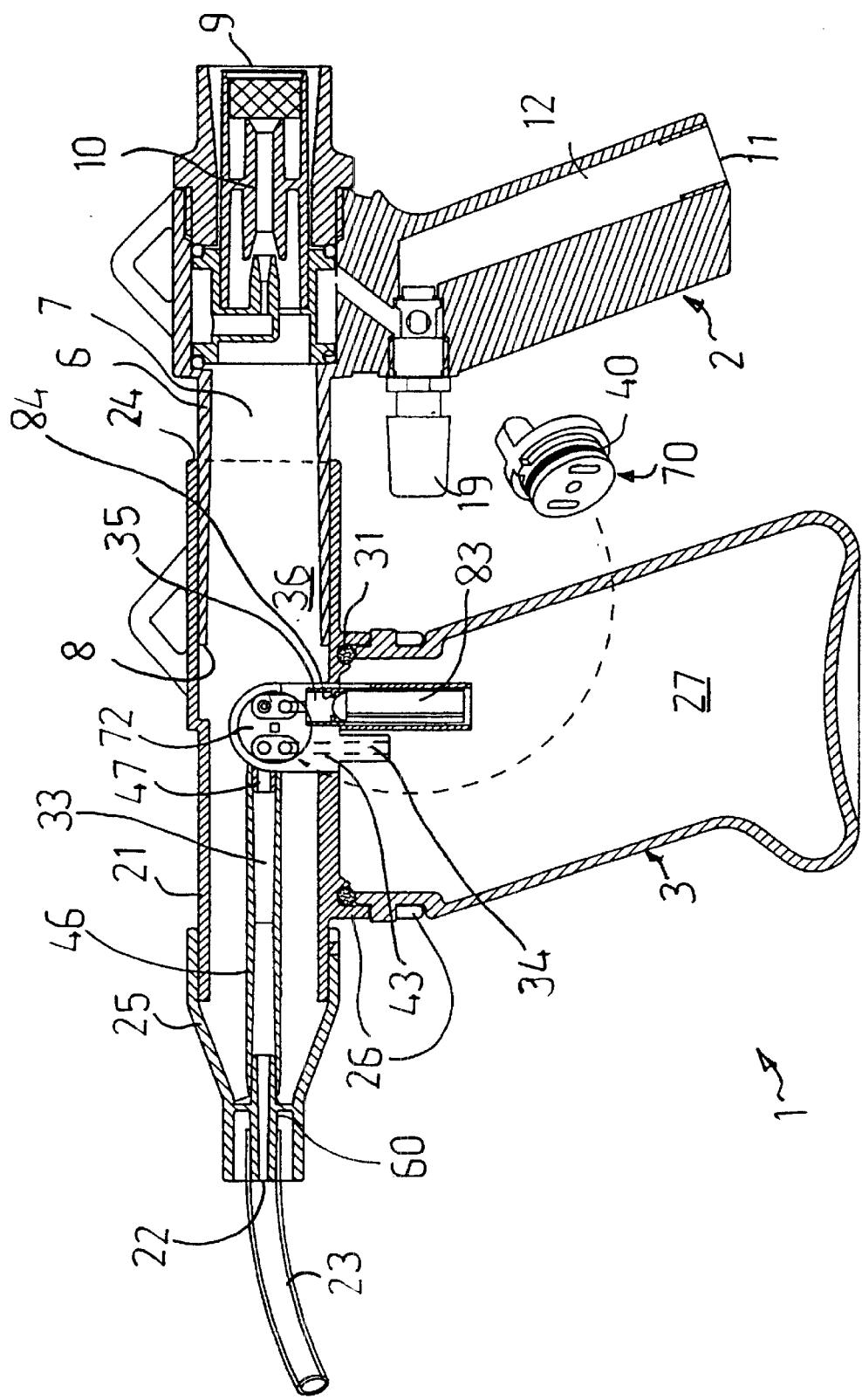
FIG. 9 is a partially sectioned elevational view and a partially exploded view of a vacuum gun assembly having a gun and an attachment for the gun, according to another embodiment of the invention

FIG. 9 shows another embodiment of the attachment 3. This attachment 3 is the same as the attachment 3 of FIG. 1 except that it has a bullet-shaped float check valve 83 for closing passage 35 when the container 27 is full of brake fluid. When brake fluid fills container 27, the float valve 83 rises until sealing against a valve seat 84 within the passage 35.

What is claimed is:

1. An attachment for a vacuum pump, for evacuating and containing a fluid from a reservoir of fluid, said attachment having:
   a body with an inlet for the fluid and an outlet, and the outlet is attachable to the pump;
   a coupling intermediate the inlet and outlet;
   a container which is releasably attachable to the coupling;
   a first passage extending between the inlet and the container;
   a second passage extending between the container and the outlet; and
   an operating member associated with at least one of the said passages and which is moveable to either close or open the associated passage, and when a vacuum is generated within the attachment by the pump and the operating member is in the open position, the fluid may be collected within the container.

2. The attachment of claim 1, further having a float valve located within the second passage which blocks this passage when the container is full of fluid.

3. The attachment of claim 1 wherein the operating member consists of a tap which is moveable between the open and closed positions.

4. The attachment of claim 3, wherein the tap is received within a spigot extending from the attachment body and the tap is able to close or open both of the said passages.

5. The attachment of claim 4, wherein the first passage is provided in part by a detachable multi-piece delivery tube extending from the inlet to the spigot.

6. The attachment of claim 5, wherein the inlet is at the end of a nozzle, and the nozzle is detachable from the remainder of the body.

7. The attachment of claim 6, further having a hose that is attachable to the nozzle.

8. The attachment of claim 1, wherein the container has reinforcing structures to prevent walls of the container from collapsing under negative pressure.

9. A vacuum gun assembly for evacuating and containing a first fluid from a reservoir of fluid, said gun assembly comprising a vacuum gun and an attachment for the gun, with said gun having:
   a body having a grip, a barrel and a bore extending through the barrel from a front end to a rear end of the gun;
   a venturi motor within the bore; and
   an inlet into the body for a second fluid which powers the venturi motor and the second fluid discharges through the rear end of the gun so that a vacuum is generated within the attachment,
with said attachment having:
   a body with an inlet for the first fluid and an outlet, and the outlet is attachable to the front end of the gun;
   a coupling intermediate the attachment body inlet and outlet;
   a container which is releasably attachable to the coupling;
   a first passage extending between the attachment body inlet and the container;
   a second passage extending between the container and the outlet; and
   an operating member associated with at least one of the passages and which is moveable to either close or open the associated passage, and when a vacuum is generated within the attachment by the gun and the operating member is in the open position, the first fluid may be collected within the container.

10. The assembly of claim 9, further having a float valve located within the second passage which blocks this passage when the container is full of the first fluid.

11. The assembly of claim 9, wherein the operating member consists of a tap moveable between the open and closed positions.

12. The assembly of claim 11, wherein the tap is received within a spigot extending from the attachment body and the tap is able to close or open both of the said passages.

13. The assembly of claim 12, wherein the first passage is provided in part by a detachable multi-piece delivery tube extending from the attachment body inlet to the spigot.

14. The assembly of claim 13, wherein the attachment body inlet is at the end of a nozzle, and the nozzle is detachable from the remainder of the attachment body.

15. The assembly of claim 14, further having a hose that is attachable to the nozzle.

16. The assembly of claim 9, wherein the container has reinforcing structures to prevent walls of the container from collapsing under negative pressure.

17. The assembly of claim 9, wherein the outlet is of sufficient diameter to seal around the front end of the gun.

18. The assembly of claim 9, wherein the gun has a perforated plate covering the discharge end of the venturi motor for reducing the noise of the second fluid leaving the gun.

19. The assembly of claim 18, wherein the gun has a porous insert adjacent the perforated plate for further reducing the noise of the second fluid prior to discharge.

20. The assembly of claim 19, wherein the insert is made of foam.

* * * * *